United States Patent [19]
Tamada et al.

[11] Patent Number: 4,912,496
[45] Date of Patent: Mar. 27, 1990

[54] AUTOMATIC FOCUSSING ADJUSTING DEVICE

[75] Inventors: Kazukyo Tamada, Tokyo; Tsuneo Yokoyama; Satoshi Mikajiri, both of Omiya; Mineo Kubota; Hiroshi Saito, both of Kofu, all of Japan

[73] Assignee: Fuji Photo Film Co., Ltd., Kanagawa, Japan

[21] Appl. No.: 245,796

[22] Filed: Sep. 19, 1988

[30] Foreign Application Priority Data

Sep. 21, 1987 [JP] Japan ................................. 62-237022

[51] Int. Cl.$^4$ ........................... G03B 3/00; G01J 1/20; A04N 5/232
[52] U.S. Cl. .................................. 354/402; 250/201.4; 358/227
[58] Field of Search .............................. 354/402–409; 250/201, 201 PF, 201 AF, 204, 578; 358/227, 213.19

[56] References Cited

U.S. PATENT DOCUMENTS

4,584,656  4/1986  Sakai et al. .................. 358/213.19
4,701,626  10/1987  Ishizaki et al. .............. 358/213.19 X Primary Examiner—W. B. Perkey
Attorney, Agent, or Firm—Birch, Stewart, Kolasch & Birch

[57] ABSTRACT

An automatic focussing adjusting device which controls properly an integration time necessary to integrate the amount of light received by a CCD line sensor for measuring the light of an object to detect a focal position. In the automatic focussing adjusting device, when the average value of the output data of the CCD line sensor is a value existing out of the stable operation region of the CCD line sensor, the integration in time for the amount of the light received from the object by the CCD line sensor is controlled so that the average value of the next output data of the CCD line sensor converges rapidly to the reference value of the output data to be selected in the CCD line sensor stable operation region. For the average value existing in the stable operation region, the integration time is controlled so that the average value of the next output data converges slowly to the reference value. Therefore, stable output data of the CCD line sensor can be obtained and can follow accurately the variations of the brightness of the object.

5 Claims, 3 Drawing Sheets

AUTOMATIC FOCUSSING ADJUSTING DEVICE

BACKGROUND OF THE INVENTION

1. Field of the Invention

The present invention relates to an automatic focussing adjusting device the, in particular, to an automatic focussing adjusting device which controls and integration time necessary to integrate the amount of light received by an CCD line sensor which measures light for detection of a focal position.

2. Description of the Related Art

In general, in an automatic focussing adjusting device for use in an optical instrument such as a camera or the like, a control device such as a microcomputer or the like analyzes the order of focussing in accordance with the signal that is output from a CCD line sensor for detecting a focus position according to the amount of light received from an object, and adjusts the position of a focus lens of a taking lens system, so that an accurate focussing can be provided.

In the CCD line sensor of the above-mentioned type, for example, 2 kinds of sensors, each comprising a plurality of light receiving elements which are arranged linearly are arranged at positions in which the respective optical paths are different from each other, and part of the light taken out of the light entering through a taking lens is focussed on the light receiving surfaces of the respective receiving elements of the two sensors. The respective sensors output electric signals having wave forms that correspond to the intensity of illumination of the object image focussed, and the quantity of de-focussing of the focal position of the focus lens is operated in accordance with the correlation between the wave forms of the two electric signals. Usually, the output level of the CCD line sensor is determined by controlling a gate time; for example, when the output level exceeds the saturation level of the CCD line sensor, the light receiving amount is controlled by shortening the next gate time over the current gate time. This is equivalent to controlling the next CCD integration time $t_N$ of the amount of the light received by the CCD line sensor, and the integration time $t_N$ is usually determined by an equation (1):

$$t_N = t_T \times \frac{D_R}{D_A} \qquad (1)$$

where $t_T$ represents the current integration time of the CCD line sensor, $D_R$ represents a reference value in the range of stable operation the CCD line sensor, that is, it stands for a reference value set within a predetermined operation range which is higher than the lowest output level and lower than the saturation level, and $D_A$ stands for an average value of the output signals of the CCD line sensors which are the integration values thereof. As mentioned above, the next integration time $t_N$ of the CCD line sensor is a value which can be obtained by increasing or decreasing the current integration time $t_T$ according to $D_R/D_A$ so that the average value $D_A$ always converges to the reference value $D_R$. In this case, the average value $D_A$ is calculated intact according to the brightness of the light of an object which varies floatingly, and thus even when the brightness changes suddenly, the average value $D_A$ can be obtained accurately.

However, in the above-mentioned method of deciding the integration time $t_N$ of the CCD line sensor for the light measurement, due to the fact that the average value $D_A$ is calculated intact according to the always varying brightnesses of the object light, when the brightness varies remarkably, the integration time $t_N$ is caused to vary to a great extent. Accordingly, with the result that the average value $D_A$ goes out of the stable operation region of the CCD line sensor and becomes a value in the unstable operation region thereof, good CCD data can not be obtained.

When the average value $D_A$ is a value present in the stable operation region of the CCD line sensor but the brightness of the field light continues to vary slightly, the integration time $t_N$ for the amount of light received by the CCD line sensor is caused to vary greatly in response consequently, the average value $D_A$ is caused to vary with respect to the reference value $D_R$, so that a delicate error in distance measurements occurs which provides an unstable condition.

SUMMARY OF THE INVENTION

The present invention aims at eliminating the drawbacks found in the above-mentioned prior art device.

Accordingly, it is an object of the invention to provide an automatic focussing adjusting device which can provide the optimum integration time $t_N$ of the CCD line sensor.

In order to achieve the above object, according to the invention, there is provided an automatic focussing adjusting device, which receives part of the light entering through a taking lens by means of a CCD line sensor, for detecting a focal position. The quantity of de-focussing is calculated in accordance with the CCD output data that is obtained from the CCD line sensor, and moves the taking lens is moved such that the quantity of de-focussing exists in an allowable range. The automatic focussing adjusting device comprises a first operation means for calculating the average value of the output data of the CCD line sensor and a second operation which in accordance with the following three factors the average value of the CCD line sensor output data calculated by the first operation means, the integration time for the amount of light received by the CCD line sensor required when the CCD line sensor output data is obtained and a reference value of the output data to be selected in the stable operation region of the CCD line sensor, for calculating the next integration time required for the average value of the CCD line sensor output data to converge rapidly into the reference value. The automatic focussing adjusting device further comprises a third operation means, in accordance with the above-calculated CCD line sensor output data average value, the integration time for the amount of light received by the CCD line sensor required when the CCD line sensor output data is obtained and the above-mentioned reference value, for calculating the next integration time for the CCD line sensor output data average value to converge slowly into the reference value; and, a decision means for deciding from the above-calculated CCD line sensor output data average value whether the CCD line sensor is in the stable operation region or not. The automatic focussing adjusting device lastly comprises an integration time control means, which when the CCD line sensor is decided not to be in the stable operation region by the decision means, for permitting the CCD line sensor to receive the light only for the integration time that is calculated by the second operation means, and, when the CCD line sensor is decided to be in the stable operation region by the decision means, for permitting the CCD line sensor to receive the light only for the integration time that is calculated by the third operation means.

In the present invention, in accordance with the result of comparison between the average value of the CCD line sensor output data obtained from the focal-position-detecting CCD line sensor and the reference value of the output data to be selected in the stable operation region of the CCD line sensor, the integration time for the amount of light received by the CCD line sensor is decided. In other words, when the CCD data line sensor output average value is a value existing out of a range of the CCD line sensor stable operation region, there is obtained such an integration time that allows the next CCD line sensor output data average value to converge rapidly into the reference value so that the CCD line sensor is able to receive the light only for the integration time.

On the other hand, when the average value of the CCD line sensor output data is a value existing in the range of the stable operation region, there is obtained such an integration time that allows the next CCD line sensor output data average value to converge slowly into the reference value so that the CCD line sensor is able to receive the light only during the integration time.

As described above, according to the invention, the integration time for the amount of light received by the CCD line sensor is decided properly in accordance with the average value of the CCD line sensor output data, and, after the average value goes out of the unstable operation region into the stable operation region, variations in the integration time are small so that the stable CCD line sensor output data that can follow accurately the variations in the brightness of the object can be obtained, resulting in accurate control of the automatic focussing.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiment of an automatic focussing adjusting device according to the present invention with reference to the accompanying drawings.

Figure 1:
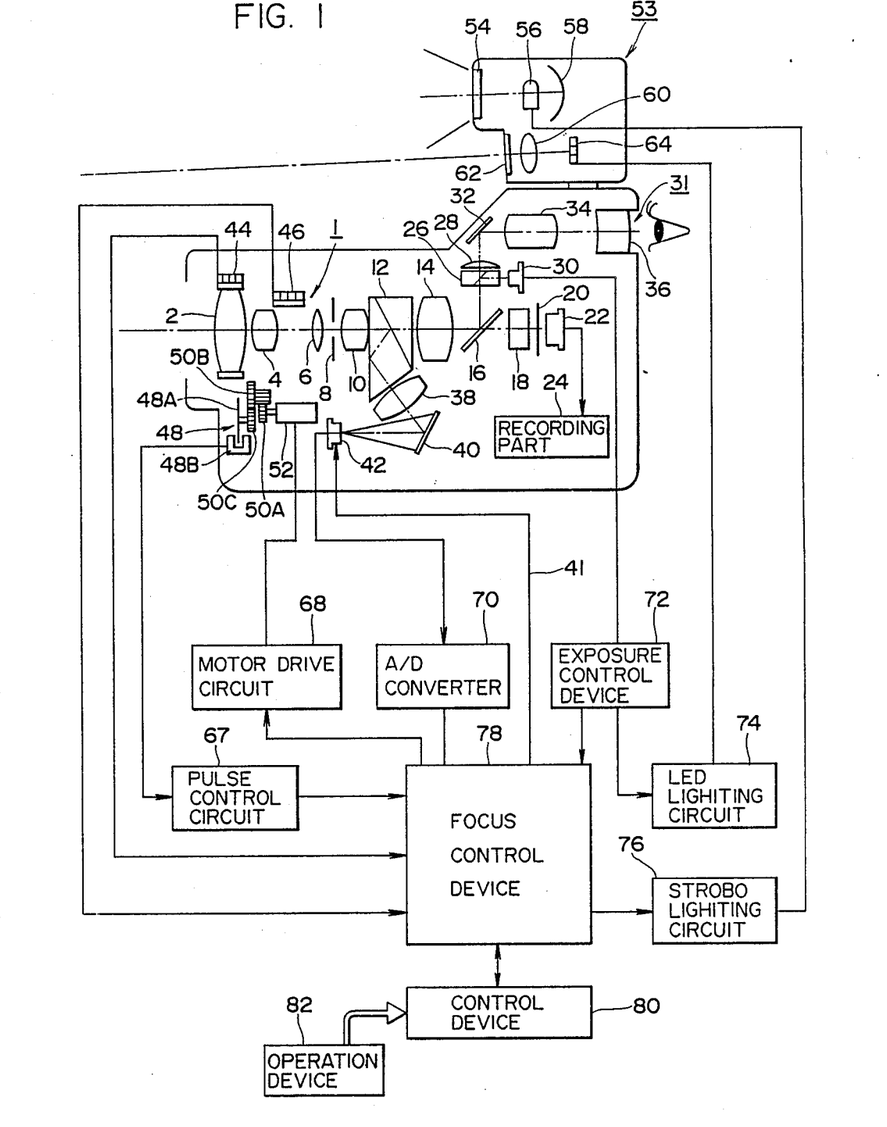
FIG. 1 is a schematic view of the whole structure of an embodiment of a camera including therein an automatic focussing adjusting device according to the invention.

Referring first to FIG. 1, there is shown the whole structure of an embodiment of a camera including therein an automatic focussing adjusting device according to the invention. In FIG. 1, a zoom lens system 1 comprises a group of focus lenses 2 for focussing an image of an object, a group of varier lenses 4 for varying a focal distance, a group of compensator lenses 6 for compensating focal divergencies which are caused by the movement of the varier lens group 4, and groups of master lenses 10, 14. Between the compensator lens group 6 and master lens group 10 there is interposed a stop diaphragm 8. Also, between the master lens groups 10 and 14, there is interposed a beam splitter 12.

The focus lens group 2 is held by a first inner cylinder (which is not shown) and the inner cylinder is arranged to communicate with a first outer cylinder and is held by the first outer cylinder. By rotating the first outer cylinder, the focus lens group 2 can be moved in an optical axis direction. The first outer cylinder can be rotated by a DC motor 52. The absolute position of the focus lens group 2 that is moved to a predetermined position with the rotational movement of the first outer cylinder can be examined by means of a grey code which is output from a focus lens position detect part 44 provided in the first outer cylinder. The grey code is made by a pattern electrode which is formed in a coded manner in the focus lens position detect part 44, and is output according to the amount of rotation of the first outer cylinder, that is, according to the movement position of the focus lens group 2. The grey code from the focus lens position detect part 44 is input to a focus control device 78. The rotational driving of the first outer cylinder is performed by a motor drive circuit 68 which drives and controls the DC motor 52, and the motor drive circuit 68 can be operated in accordance with a drive signal which is output from the focus control device 78. The focus control device 78 outputs the drive signal by reference to the grey code from the focus lens position detect part 44. Detection of the position of the focus lens group 2 is not always limited to the detection using the above-mentioned grey code, but the position of the focus lens group 2 may be detected in an optical manner by providing a slit in the rotational member of the cylinder. Also, the position detection is not always limited to the detection of the absolute position.

The DC motor 52 has a shaft of rotation to which there is fixedly secured a small gear 50A. The first outer cylinder is rotated through a gear 50B which intermeshes with the gear 50A. The relative amount of rotation of the first outer cylinder is detected by an encoder 48 which is composed of a disc 48A provided with a large number of radially formed slits and a photo-interrupter 48B. The disc 48A is fixedly secured to a gear 50C intermeshing with the gear 50B, and the outer peripheral portion of the disc 48A is inserted into an air gap in a recessed portion formed in the photo-interrupter 48B. A pulse signal which is output from the photo-interrupter 48B with the rotation of the disc 48A is input to a pulse count circuit 67 and is then counted there. The count value is supplied to a focus control device and the amount of movement of the focus lens group 2 is operated in accordance with the count value.

The varier lens group 4 and compensator lens group 6 are held by a second inner cylinder (not shown) which is in turn arranged to communicate with a second outer cylinder and is supported by it. The second outer cylinder if formed in the inside thereof with a cam groove in which there is positioned a pin projected on and from the outer side of the second inner cylinder. While a magnification is caused to vary by means of rotation of the second outer cylinder, an image of an object can be always focussed at a predetermined position. The magnification can be examined by a grey code which is output from a magnification detect part 46 provided in the second outer cylinder and is similar to the above-mentioned grey code. The grey code from the magnification detect part 46 is input to the focus control device 78.

The beam splitter 12 allows part of an incident light to diverge in a predetermined direction and then to be received by a CCD line sensor 42 through a lens for AF (Auto Focus) 38 and a reflex mirror 40. The CCD line sensor 42 comprises two kinds of sensors which are located in different optical paths and the respective sensors output electric signals each having a wave form which corresponds to the brightness of the object image focussed on a light receiving surface. The CCD line sensor 42 is set such that the stable operation region thereof is 25%~75% of the saturation level thereof and, in particular, the lower limit value $D_L$ of the stable operation region is 25% of the saturation level and the upper limit value $D_H$ is 75% of the saturation level. Also, the reference value $D_R$ of the stable operation region is set to 50% of the saturation level. The output signals from the CCD line sensor 42, after they are converted by an A/D converter 70 to, for example, 8-bit digital signals, are input to the focus control device 78. In accordance with the correlation between the respective wave forms of the two electric signals, the amount of de-focussing is controlled and also the direction of deviation of the focal position (front pin, rear pin) is determined.

The reference voltage of the A/D converter 70 is set at the same value of the saturation level of the CCD line sensor 42 in order to gain the effective figure of a conversion value. As a result, the A/D converter 70 converts a signal from the CCD line sensor 42 to a digital signal in the range from "0000 0000" to "1111 1111". For example, the A/D converter 70 converts input signals representing the upper limit value $D_H$, reference value $D_R$ and lower limit value $D_L$ of the stable operation region of the CCD line sensor to digital signals of "1100 0000", "1000 0000" and "0100 0000", respectively. The CCD line sensor 42 is driven and controlled by the focus control device 78; for example, the gate time of the CCD line sensor 42, that is, the integration time for the amount of light received by the CCD line sensor 42 is controlled by a gate signal 41.

The stop diaphragm 8 has a stop hole for controlling the quantity of light and the size of the hole is adjusted by a servo motor (not shown) which is driven and controlled by an exposure control device 72.

The light that has passed through the zoom lens system is reflected 90° upwardly by a reflex mirror 16 and is allowed to enter a beam splitter 26. The reflex mirror 16 is adapted to jump up in photographing, whereby the incident light can be focussed through a low-pass filter 18 and a shutter 20 on the light receiving surface of a CCD 22 for photographing. Electric charges corresponding to the object images are accumulated in the light receiving surface of the CCD 22 and the electric signals that correspond to the electric charge patterns are output to a recording part 24.

The low-pass filter 18 removes the high frequency component of the light to prevent generation of interference fringes, and the shutter 20 controls the light receiving time of the CCD 22. The recording part 24 creates a video signal representing the object image in accordance with an input signal and also records the video signal onto a recording medium such as a magnetic disc or the like.

The light that enters the beam splitter 26, as it is, is allowed to leave the beam splitter 26 through a focusing lens 28 for a finder optical system 31, and part of the incident light in the beam splitter 26 is made to diverge and is then received by a light receiving element 30. The electric signal that is photoelectrically converted is input to the exposure control device 72 and the exposure control device 72, in accordance with this input signal, controls the stop value of the stop diaphragm 8 and the shutter speed of the shutter 20.

The finder optical system 31 comprises a reflex mirror 32, a relay lens 34 and an eyepiece 36. The light that enters the finder optical system 31 is reflected 90° in the right direction by the reflex mirror 32, is focussed by the relay lens 34, and then reaches the eyepiece 36.

On the top portion of a main body of a camera, there is arranged a strobe light 53. The strobe-light 53 comprises a Fresnel lens 54, a discharge tube 56 and a concave reflex mirror 58. The discharge tube 56 is turned on instantaneously by a strobe lighting circuit 76 which is controlled by the focus control device 78. The discharge tube 56 emits a discharge light having a color temperature close to that of day light and the discharge light is reflected in a forward direction by the concave reflex mirror 58. The discharge light is diffused by the Fresnel lens 54 and is then thrown onto the object.

Also, in the main body of the strobe-light 53, there is provided a light emitting element 64 which can emit an auxiliary light when the brightness of the field light is short for automatic focussing. As the light emitting element 64, in the present embodiment, for example, there are employed several light emitting diodes (LEDs). The LEDs 64 can be controlled by LED lighting circuit 74 which is controlled by the exposure control device 72. Each of the LEDs 64, in the present embodiment, emits a light having a wavelength of about 7000 nm and this light is thrown onto the object through a projection lens 60 and a cover glass 62. Also, the lighting information on the LEDs 64 is applied from the exposure control device 72 to the focus control device 78.

The focus control device 78 is a device which generally controls the whole automatic focussing mechanism and it comprises a memory to store programs and data necessary to perform the focus control, and an interface for connection with peripheral elements, circuits, devices and the like. Also, the focus control device 78 transmits and receives various data to and from a control device 80.

The control device 80 is a device which generally controls the camera main body to which are connected an operation part for a power switch, a shutter release button and the like, a display part (not shown) for displaying various data, and the like.

Control of the automatic focussing is initiated by operating the shutter release button after the power switch is closed. That is, in the present embodiment, the shutter release button can be operated in a two-stroke manner; in the first stroke of the shutter release button, power is applied to the respective devices and circuits so that the focussing control and the like can be performed; and, in the second stroke thereof, control of photographing and recording is carried out.

Figure 2:
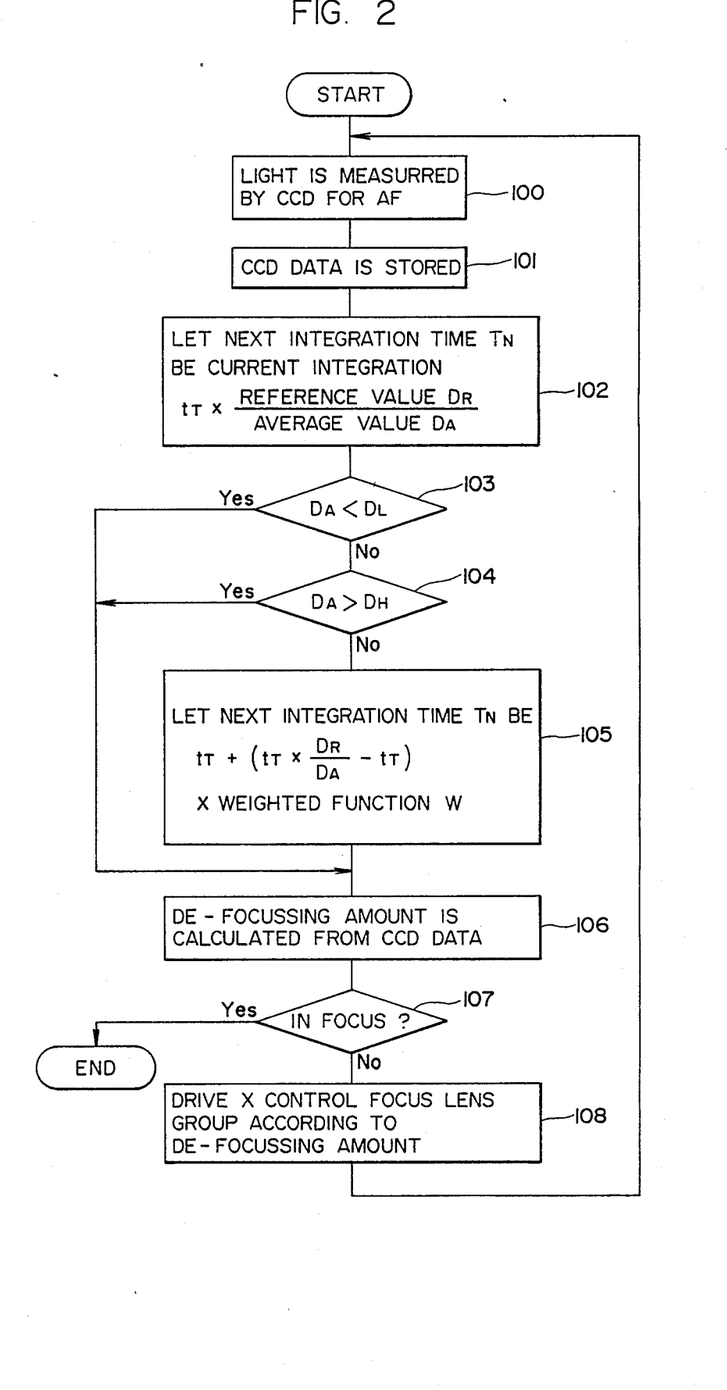
FIG. 2 is a flow chart to show how to measure light for automatic focussing control; and, FIG. 3 is a characteristic view to show an example of the output characteristic of a CCD line sensor.

Next, description will be given of a program on the automatic focussing adjustment in a camera constructed in the above-mentioned manner with reference to a flow chart shown in FIG. 2.

After the power switch of the operation part 82 is closed to activate the power supply in the first stroke of the shutter release button the light measurement for the focussing control is initiated. In the light measurement, the focus control device 78 obtains through the control device 80 the information showing that the shutter release button is already depressed and, responsive to the information, the focus control device 78 first outputs the gate signal 41 to the CCD line sensor for AF 42 only for a predetermined Term T (for example, T=40 ms). Responsive to this, when receiving the gate signal 41, the CCD line sensor 42 receives only for the term T the light that enters through the beam splitter 12, AF lens 38 and reflex mirror 40, and accumulates the electric charges that correspond to the illumination distributions on the light receiving surface thereof (Step 100). The electric charges accumulated on the light receiving surface of the CCD line sensor are read out in the form of a predetermined clock frequency by the drive signal that is output from the focus control device 78, and the output signal is then input to the A/D converter 70.

The focus control device 78 receives a digital signal from the A/D converter 70 to store it in the memory (Step 101), and calculates the average value $D_A$ of the signals output from the CCD line sensor 42 after they are integrated in accordance with the digital signal.

Next, according to the before-described first (1) equation, the ratio of the average value $D_A$ to the reference value $D_R$ ($D_R/D_A$) is obtained, the ratio is multiplied by the term T during which the gate signal 41 is being output, that is, the current integration time $t_T$ (let $t_T=T$), and the resultant value is considered as the term T during which the next gate signal 41 is being output, that is, the next integration time $t_N$ (let $t_N=T$) (Step 102).

After calculation of the next integration time $t_N$, it is checked whether the average value $D_A$ is in or out of the stable operation region. At first, in Step 103 it is checked whether the average value $D_A$ is smaller than the lower limit value $D_L$ or not and, if it is decided that the average value $D_A$ is smaller than the lower limit value $D_L$ in this check, then the brightness of the field light is regarded as short, with the result that the program advances to Step 106. On the other hand, if the average value $D_A$ is found greater than the lower limit value $D_A$ in Step 103, then the program advances to Step 104, where it is checked whether the average value $D_A$ is greater than the upper limit value $D_H$. If the average value $D_A$ is found greater than the upper limit value $D_H$ in Step 104, then the brightness of the field light is regarded as excessive, with the result that the program moves to Step 106.

In Step 106, the amount of de-focussing $\Delta P$ of the focus lens group 2 is calculated according to a predetermined algorithm, based on the output data of the CCD line sensor 42 that is stored in the above-mentioned memory and, at the same time, the direction of deviation of the focal position of the focus lens group 2 is checked.

After completion of the processing in Step 106, the program goes to Step 107, where it is checked in accordance with the de-focussing amount $\Delta P$ whether the focus lens group 2 is in focus or not. If the de-focussing amount $\Delta P$ is a value which exceeds a predetermined range representing the in-focus state, then the focus lens group 2 is regarded as not in focus yet and, consequently, the program advances to Step 108, where the distance for the focus lens group 2 to be moved is calculated according to the amount of de-focussing thereof. The focus control device 78 outputs a drive signal to the motor drive circuit 68 to thereby rotate and control the DC motor 52 so as to move the focal position of the focus lens group 2 by a predetermined distance in a predetermined direction.

After completion of the processing in Step 108, the program goes back to Step 100, where the light measuring operation for the automatic focussing control is repeated again.

On the other hand, in the checking in the above-mentioned Step 107, if the amount of de-focussing P is found to be a value within the predetermined range representing the in-focus state, then the automatic focussing control is terminated and the program moves to another processing routine where photographing and recording are executed.

On the other hand, in the checking in the above-mentioned step 104, if the average value $D_A$ is found smaller than the upper limit value $D_H$, the average value $D_A$ is regarded as a value existing in the range of the stable operation region and thus the program advances to Step 105. In Step 105, the next integration time $t_N$ is calculated according to a second (2) equation to be described below.

$$t_N = t_T + \left( t_T \times \frac{D_R}{D_A} - t_T \right) \times W \quad (2)$$

To obtain the next integration time $T_N$, the current integration time $t_T$ (let $t_T=T$) is increased or decreased according to the ratio of the average value $D_A$ to the reference value $D_R$ to obtain a value ($t_T \times D_R/D_A - t_T$), the value ($t_T \times D_R/D_A - t_T$) is multiplied by a predetermined weighted function W for stabilizing the variations of the integration time, and further the current integration time $t_T$ is added to the above.

In the present embodiment, the weighted function W is set such that W=½ to slow the variations of the next integration time $t_N$.

Figure 3:
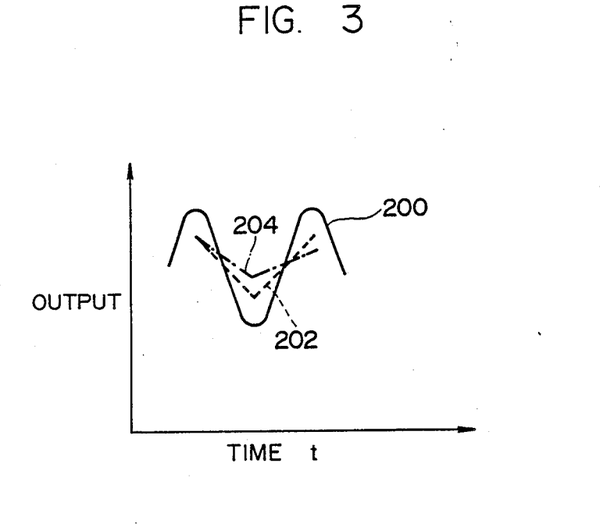

As a result, when the CCD line sensor 42 receives light 200 having a luminous intensity which varies within a given range such as the illumination of a fluorescent lamp as shown in FIG. 3 and also when the average value $D_A$ of the output signal of the CCD line sensor 42 shows a value existing within the stable operation region thereof, the average value $D_A$ that is obtained from the next integration time $t_N$ calculated according to the before-mentioned (1) equation represents a value which is shown by a broken line 202 in FIG. 3, while the variations of the next integration time $t_N$ calculated according to the (2) equation are reduced by means of a correction term including the weighted function W so that the variations of the average value $D_A$ can be controlled or reduced as shown by a one-dot chained line 204.

After completion of the processings in Step 106, the program advances to Steps 107, 108 where similar processings to those described above are repeated until the focus lens group 2 is in focus.

It is noted that the weighted function W is not always limited to ½, but it can be set to any other value provided that 0<W<1 is satisfied.

As described above, in the camera according to the present embodiment, in controlling the automatic focussing, it is checked the average value $D_A$ of the integrated signals output from the CCD line sensor 42 for AF is in the stable operation region or not and, as a result of this check, if the average value $D_A$ is a value existing out of the stable operation region, then, in order that the average value $D_A$ can be made to rapidly converge to the reference value $D_R$, the next integration time $t_N$ is increased or decreased according to the ratio of the reference value $D_R$ to the average value $D_A$ ($D_R/D_A$), based on the current gate time, namely, the current integration time $t_T$.

On the other hand, if it is found that the average value $D_A$ exists in the stable operation region, then the next integration time $t_N$ is calculated so that the average value $D_A$ can be made to slowly converge to the reference value $D_R$. To obtain the next integration time $t_T$, the current gate time, that is, the current integration time $t_T$ is increased or decreased according to the ratio of the reference value $D_R$ to the average value $D_A$ ($D_R/D_A$), the resultant value is given a predetermined weight, and further the current integration time $t_T$ is added to the weighted value. By means of this, the variations of the next integration time $t_N$ can be reduced when compared with a case in which the average value $D_A$ exists out of the stable operation region.

As has been described hereinbefore, in the automatic focussing adjusting device according to the present invention, if the average value of the output data of the CCD line sensor that is obtained from the CCD line sensor for detection of focal position is a value which exists out of the stable operation region of the CCD line sensor, the amount of the light received by the CCD line sensor is integrated by the integration time that allows the average value of the next output data of the CCD line sensor to rapidly converge to the reference value of the output data to be selected in the stable operation region of the CCD line sensor. On the other hand, if the above average value is a value existing in the stable operation region of the CCD line sensor, the amount of the light received by the CCD line sensor is integrated by the integration time that allows the average value of the next output data of the CCD line sensor to slowly converge to the above-mentioned reference value, whereby the CCD line sensor can be operated rapidly in the stable operation region thereof and thereafter the amount of variations of the integration time can be reduced. Therefore, it is possible to obtain the output data of the CCD line sensor that can follow accurately the variations of the brightness of the object, so that the automatic focussing can be controlled accurately.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An automatic focussing adjusting device in which part of light entering through a taking lens is received by a CCD line sensor for detecting focal position, an amount of de-focussing is calculated in accordance with data that is output from said CCD line sensor and which said output data represents the distribution of the illumination of an object, said taking lens is moved such that said amount of de-focussing is in an allowable range, said automatic focussing adjusting device comprising:

first operation means for calculating the average value of said output data of said CCD line sensor;

second operation means for calculating a first integration time, in accordance with; (a) said average value of said output data of said CCD line sensor, (b) an integration time necessary for integration of an amount of light received by said CCD line sensor when said output data of said CCD line sensor is obtained, and (c) a reference value for output data to be selected in a stable operation region of said CCD line sensor, wherein said first integration time is a value necessary for said average value of said output data of said CCD line sensor to rapidly converge to said reference value;

third operation means for calculating a second integration time, in accordance with; (a) said average value of said output data of said CCD line sensor, (b) an integration time necessary for integration of an amount of light received by said CCD line sensor when said output data of said CCD line sensor is obtained, and (c) said reference value, wherein said second integration time is a value necessary for said average value of said output data of said CCD line sensor to slowly converge to said reference value;

decision means for deciding whether said CCD line sensor is in the stable operation region thereof or not according to said average value of said output data of said CCD line sensor; and, integration time control means wherein if said CCD line sensor is not found in the stable operation region thereof by said decision means, said integration time control means allows said CCD line sensor to receive said light only for the first integration time that is calculated by said second operation means, and, wherein if said CCD line sensor is found in the stable operation region thereof by said decision means, said integration time control means allows said CCD line sensor to receive said light only for the second integration time that is calculated by said third operation means.

2. An automatic focussing adjusting device as set forth in claim 1, wherein said integration time control means allows said CCD line sensor to receive said light only for a preset time in the first automatic focussing adjusting operation.

3. An automatic focussing adjusting device as set forth in claim 2, wherein said reference value is about one-half of a saturation level of said CCD line sensor.

4. An automatic focussing adjusting device as set forth in claim 3, wherein said second operation means calculates said first integration time $t_N$ according to the following equation, $$t_N = t_T \times \frac{D_R}{D_A}$$

where $D_A$ represents said average value of said output data of said CCD line sensor calculated by said first operation means, $t_T$ represents the integration time of said CCD line sensor at the time when said output data of said CCD line sensor is obtained, and $D_R$ represents said reference value.

5. An automatic focussing adjusting device as set forth in claim 4, wherein said third operation means calculates said second integration time $t_N$ according to the following equation $$t_N = t_T + \left( t_T \times \frac{D_R}{D_A} - t_T \right) \times W$$

where $0 < W < 1$, where $D_A$ represents said average value of said output data of said CCD line sensor calculated by said first operation means, $t_T$ represent the integration time of said CCD line sensor at the time when said output data of said CCD line sensor is obtained, $D_R$ represents said reference value, and W represents a weighted function.

* * * * *

UNITED STATES PATENT AND TRADEMARK OFFICE
CERTIFICATE OF CORRECTION

PATENT NO. : 4,912,496
DATED : March 27, 1990
INVENTOR(S) : K. TAMADA et al

It is certified that error appears in the above-identified patent and that said Letters Patent is hereby corrected as shown below:

On the title page, item [75]:

Please change the first inventor's name from "Kazukyo Tamada"

to --Kazukiyo Tamada--.

Signed and Sealed this

Sixth Day of August, 1991

Attest:

HARRY F. MANBECK, JR.

*Attesting Officer*      *Commissioner of Patents and Trademarks*